Jan. 19, 1960  B. N. TORELL  2,921,433
AFTERBURNER CONTROL FOR A MULTISPOOL GAS TURBINE POWER PLANT
Filed Jan. 20, 1956
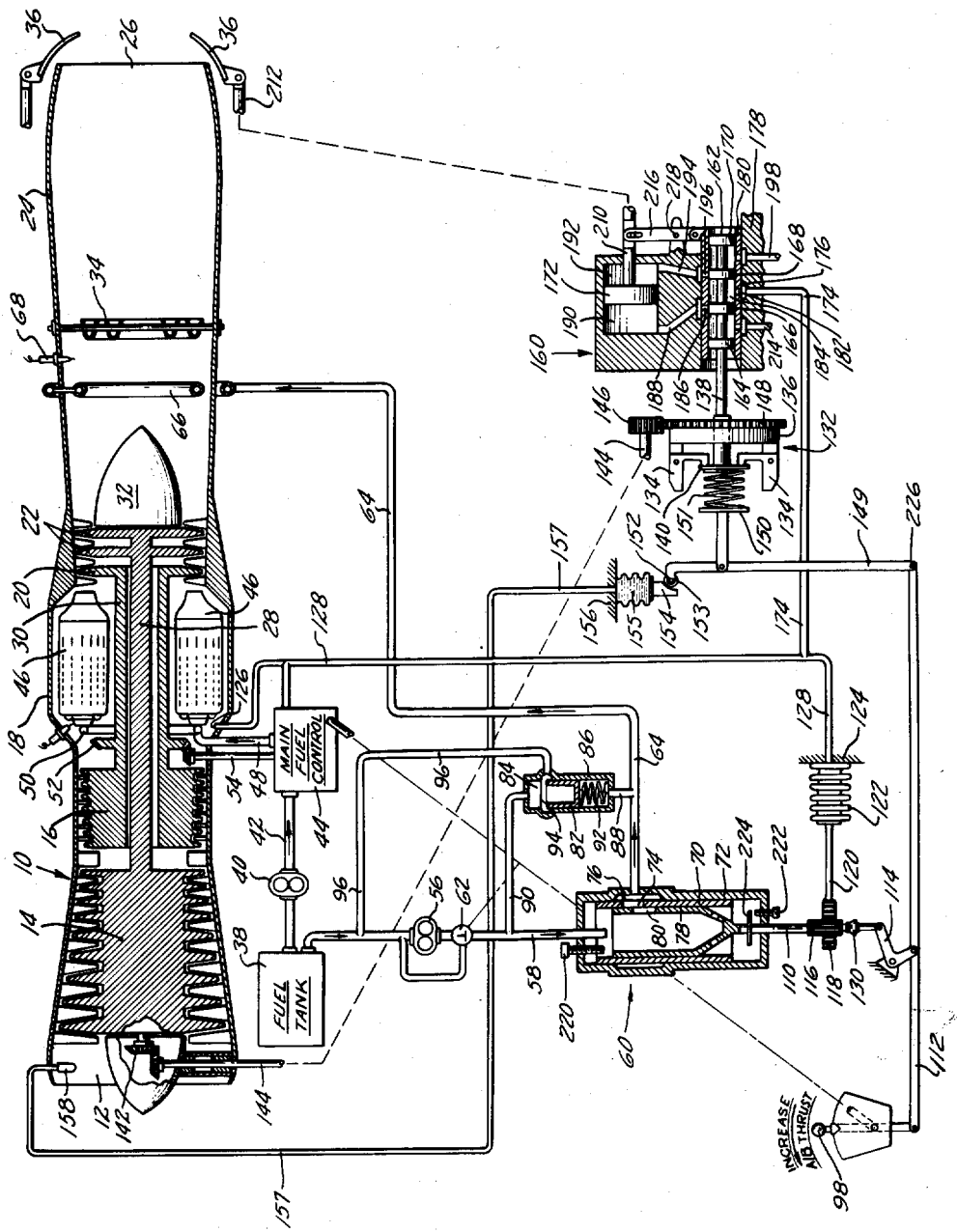
INVENTOR
BRUCE N. TORELL
BY Russell M. Lipes, Jr.
ATTORNEY

United States Patent Office

2,921,433
Patented Jan. 19, 1960

2,921,433

AFTERBURNER CONTROL FOR A MULTISPOOL GAS TURBINE POWER PLANT

Bruce N. Torell, Wethersfield, Conn., assignor to United Aircraft Corporation, East Hartford, Conn., a corporation of Delaware Application January 20, 1956, Serial No. 560,392

9 Claims. (Cl. 60—35.6)

This invention relates to multispool, afterburning gas turbine power plants for aircraft, more particularly to an afterburner control which regulates afterburner fuel flow and exhaust nozzle area.

A multispool gas turbine power plant is one in which the compressor and the turbine are each split into a plurality of separate rotors, each rotor comprising one or more compressor or turbine stages. Each of the compressor rotors is connected to and driven by a turbine rotor, the unit forming what is called a spool. The various spools are coaxially arranged within the power plant. In a twin spool gas turbine power plant one or more of the downstream turbine stages are connected to and drive one or more of the upstream compressor stages, forming what is known as the low pressure spool since both the compressor stages and the turbine stages operate with gases at a lower pressure than the gases flowing through the remaining compressor and turbine stages. The remaining turbine stages are connected to and drive the remaining compressor stages, the unit surrounding the connection between the low pressure compressor and turbine stages and being known as the high pressure spool.

Fuel flow to a gas turbine power plant generally is metered as a function of the rotational speed of the compressor or turbine rotors, which in the case of most gas turbine power plants are connected together as a unit and rotate at the same speed. Multispool gas turbine power plants, however, have two or more spools which tend to rotate at various and independent speeds and only one spool speed is used as a signal to the main fuel meter or control. In the case of a twin spool power plant, it is customary, though not essential, to use the speed of the high pressure spool as a signal to the fuel control. This means that the speed of the low pressure spool is ungoverned and is controlled only through its unique relationship to the speed of the high pressure spool.

It is commonly the case with conventional twin spool power plants with fixed exhaust nozzle area that the speed of the low pressure spool is reduced as the temperature at the inlet to the low pressure compressor is increased, providing the speed of the high pressure spool is controlled to maintain a fixed turbine inlet temperature. This reduction in low pressure spool speed represents a loss in air flow through the power plant and, consequently, a loss in thrust which is not appreciable at subsonic air speeds but which may reach values of 15 to 20 percent at low pressure compressor inlet temperatures corresponding to high speed supersonic flight. The speed of the low pressure spool can be controlled independently of the high spool speed by regulating the pressure drop of the gases across the low pressure turbine. This may be effected by varying exhaust nozzle area to increase or decrease the pressure downstream of the last turbine stage, thus bringing about a change in the pressure drop across the turbine and, consequently, a change in spool speed.

Flight at supersonic speeds is generally accomplished only during afterburning operation and as a result, increase of the pressure drop across the low pressure turbine for the purpose of holding the speed of the low pressure spool constant is needed only during afterburning operation. By varying exhaust nozzle area during afterburning operation as a function of low pressure compressor inlet temperature, speed regulation may be accomplished. It should be noted that for a power plant significantly affected by Reynolds number in the compressor, it may be desirable to also bias the exhaust nozzle area as a function of power plant inlet pressure or any power plant pressure which is proportional to inlet pressure.

It also should be noted that the procedure for maintaining constant low pressure spool speed is effective in providing added thrust as airplane Mach number is increased only up to the point where the gain in thrust due to added airflow is not exceeded by the loss in thrust due to tailpipe losses. This generally occurs at a specific tailpipe Mach number and can in turn be related to the low pressure compressor inlet temperature. By stopping the increase of exhaust nozzle area above a specific value of the temperature, this loss of thrust is avoided.

It should be further noted that for some gas turbine power plants the procedure for maintaining constant low pressure spool speed over the full range of low pressure compressor inlet temperature up to the point of the tailpipe Mach number limitation is not desirable. For example, some power plants may have the flow area at the inlet to the low pressure compressor somewhat limited in which case inlet Mach number may become restrictive in the lower range of inlet temperature. For these power plants inlet Mach number can be directly related to corrected low pressure spool speed, i.e. to the ratio of actual low pressure spool speed to a unique function of low pressure compressor inlet temperature. Therefore, it would be desirable to vary the exhaust nozzle area of these power plants with low pressure compressor inlet temperature such that a constant corrected low pressure spool speed is not exceeded. The resultant increase of actual low pressure spool speed with an increase of inlet temperature would be continued as inlet temperature increased up to the point where the structural limit on the low pressure spool was reached. With further increase of low pressure compressor inlet temperature, exhaust nozzle area would be increased only as necessary to hold the speed of the low pressure spool at a constant actual value. This schedule would be followed until the tailpipe Mach number limitation was reached at which point exhaust nozzle area would be maintained at a constant value for all higher inlet temperatures.

The foregoing discussion relates to the obtaining of maximum thrust from the power plant at supersonic speeds. In addition, it is desirable in some applications to be able to obtain a thrust somewhat less than the maximum with afterburning but somewhat greater than that available from the power plant without afterburning. It has commonly been the practice to obtain this reduction of thrust by reducing both the low pressure and high pressure spool speeds through reduction of fuel flow to the main combustion section. Such a method has the disadvantages of reducing cycle efficiency and reducing power plant air flow. The latter disadvantage is undesirable because of the relatively small air flow range over which current supersonic inlet diffusers will operate stably at any particular Mach number.

By reducing thrust through a reduction of the afterburner temperature rise, it is possible to maintain reasonably efficient operation without changing the speed of either spool or changing the air flow through the power plant. This can be accomplished by properly coordinating the reduction of exhaust nozzle area with a reduction of afterburner fuel flow or fuel/air ratio. Under some circumstances it may be necessary to reduce thrust to a lower level than can be obtained solely by the foregoing procedure. This might be the case when the afterburner fuel flow has been reduced to the lean blowout limit. At this point, further reduction of thrust would be effected by selecting a lower speed for both the low and high pressure rotors.

An object of this invention, therefore, is to improve the operation of a multispool, afterburning gas turbine power plant.

Another object of the invention is to provide an afterburner control for an afterburning, multispool gas turbine power plant which enables maximum thrust to be obtained from the power plant at supersonic speeds.

Another object of the invention is to provide an afterburner control for an afterburning, multispool gas turbine power plant which enables operation of the power plant during partial afterburning without changing spool speed or airflow through the power plant.

Another object of the invention is to control afterburner operation of a multispool gas turbine power plant by manually scheduling fuel flow to the afterburner and at the same time establishing the datum for a speed governor for one of the spools.

Still another object of the invention is to provide an afterburner control which manually schedules fuel flow to the afterburner, and which regulates exhaust nozzle area to control the actual speed of the low pressure spool in a twin spool gas turbine power plant.

Other objects and advantages will be apparent from the specification and claims, and from the accompanying drawing which illustrates an embodiment of the invention.

In the drawing, the single figure shows an afterburner control in accordance with this invention in combination with a twin spool, afterburning gas turbine power plant for aircraft.

Referring to the drawing in detail, the gas turbine power plant is indicated generally at 10, the power plant having inlet 12, low pressure compressor rotor 14, high pressure compressor rotor 16, combustion section 18, high pressure turbine rotor 20, low pressure turbine rotor 22, afterburner 24 and exhaust nozzle 26 in succession in the direction of gas flow through the power plant. Compressor rotor 14 is connected to turbine rotor 22 by means of shaft 28 to form a low pressure spool. Compressor rotor 16 is connected to turbine rotor 20 by means of sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and eyelids 36 for varying the area of exhaust nozzle 26.

Fuel is supplied to the power plant from tank 38. Fuel for combustion section 18 is pumped by pump 40 through conduit 42 to main fuel control 44. From here fuel is delivered to burner cans 46 in combustion section 18 through conduit 48 and annular manifold 50 connecting the burner cans. By means of gear 52 on sleeve 30 and gear shaft 54 connected to and driven by gear 52, main fuel control 44 meters fuel to combustion section 18 as a function of the speed of the high pressure spool. A control for metering fuel flow to a gas turbine power plant as a function of speed as well as other power plant operating variables is shown in copending application Serial No. 337,995, filed February 20, 1953, for Fuel Control for Gas Turbine Power Plants.

Fuel for the afterburner is supplied by pump 56 through conduit 58 to afterburner fuel control 60. Valve 62 in conduit 58 controls the admission of fuel to the afterburner fuel system and is intended to admit fuel to the control and the afterburner only when afterburning operation of the power plant is desired. Fuel flows from afterburner fuel control 60 through delivery conduit 64 to annular manifold 66 mounted within afterburner 24 and from which the fuel is discharged into the afterburner. Spark plug 68 is provided for initiating combustion in the afterburner.

Afterburner fuel control 60 includes liner 70 fixed within casing 72, the liner having one or more rectangular ports 74 communicating through annular groove 76 in casing 72 with delivery conduit 64. A movable sleeve 78, having one or more rectangular ports 80 substantially in alignment with ports 74, fits within liner 70 and is both rotated and translated to regulate fuel flow to the afterburner by varying the effective area of ports 74 and 80. Fuel from conduit 58 flows into sleeve 78 and then passes through ports 80 and 74, groove 76, and conduit 64 to the afterburner.

For the purpose of making fuel flow to the afterburner solely a function of the effective area of metering ports 74 and 80, the pressure drop across the ports is maintained constant by a suitable device which may include piston 82 within chamber 84 in casing 86. Conduit 88 connects delivery conduit 64 downstream of ports 74 and 80 with the lower end of chamber 84 to subject the bottom of piston 82 to afterburner fuel control outlet pressure. Conduit 90 connects inlet conduit 58 upstream of ports 74 and 80 with the opposite end of the chamber to subject the top of the piston to fuel control inlet pressure. Spring 92 assists the pressure from conduit 88 acting on the piston. In operation of the device, a variation in fuel pressure upstream or downstream of the metering ports results in movement of piston 82 to vary the effective area of orifice 94 and the quantity of fuel by-passed through conduit 96 to the inlet of pump 56.

Sleeve 78 in afterburner fuel control 60 is moved axially upon rotation of power lever 98, the lever being connected to stem 110 on the sleeve by link 112 and bell crank 114. During afterburning operation of the power plant, if the position of the power lever is changed by the pilot the sleeve is moved axially to vary the effective area of metering ports 74 and 80 and regulate fuel flow to the afterburner accordingly.

In addition to being shiftable axially as a function of power lever position, sleeve 78 is rotatable as a function of a power plant pressure. In the arrangement shown the rotational position of the sleeve is a function of compressor discharge pressure. This pressure is used to provide a proportionality between fuel flow and air flow, the latter being a function of pressure. The sleeve has integral therewith pinion 116 on stem 110, the pinion meshing with rack 118. The rack is connected by rod 120 to the free end of bellows 122, the opposite end of the bellows being connected to fixed surface 124. Pressure station 126 located in the combustion section inlet downstream of the last stage of high pressure compressor rotor 16 is connected by conduit 128 to the interior of bellows 122 so that variations in compressor discharge pressure cause expansion or contraction of the bellows and longitudinal movement of rack 118. This in turn rotates sleeve 78 to vary the area of metering ports 74 and 80 as a function of compressor discharge pressure and consequently as a function of airflow. Coupling 130 permits rotational movement of the sleeve with respect to its power lever linkage. It is to be noted that compressor discharge pressure is essentially the same as the pressure within combustion section 18, and that the pressure sometimes is referred to as burner case pressure.

Movement of power lever 98 schedules the axial position of sleeve 78 and thus fuel flow to the afterburner, and at the same time establishes the datum for droop governor 132 connected to and driven by the low pressure spool in the power plant. The governor includes flyweights 134 mounted on annular plate 136 surrounding stem 138 which is part of a servo mechanism controlling the position of eyelids 36. The flyweights act against shoulder 140 on the stem. The governor senses low pressure rotor speed through a gear train including bevel gear 142 mounted on the forward end of low pressure rotor 14, the gear driving gear shaft 144. Pinion 146 on the gear shaft meshes with and drives gear 148 integral with plate 136. During operation of the power plant, if the speed of the low pressure spool should change the flyweights exert a greater or a lesser force upon shoulder 140.

The datum establishing means for governor 132 includes power lever connected link 112, pivotable link 149, and movable abutment 150 connected to link 149. Speeder spring 151 is located between shoulder 140 and abutment 150 and movement of power lever 98 actuates the linkage to vary the position of the abutment and the loading on the spring. Movement of the power lever and link 112 rotates link 149 about relatively fixed pivot 152, the position of the pivot being a function of the total temperature at the power plant inlet. Roller 153 is mounted on the top end of link 149 and is in contact with cam 154 connected to the free end of liquid filled bellows 155, the opposite end of the bellows being secured to fixed surface 156. Conduit 157 connects the interior of the bellows with temperature responsive bulb 158 mounted in power plant inlet 12 so as to sense total temperature within the inlet. Variations in inlet temperature expand or contract bellows 155 to move cam 154 and adjust the position of pivot 152 as well as vary exhaust nozzle area as a function of compressor inlet temperature.

The servo mechanism for actuating eyelids 36 is servo motor 160. Stem 138 and shoulder 140, described above in connection with droop governor 132, are connected to pilot valve 162 in the servo motor. The pilot valve has a series of lands, 164, 166, 168 and 170 thereon, the lands controlling the admission of a suitable pressure to opposite sides of piston 172 for moving the piston. In this embodiment compressor discharge pressure is used as the moving force. Branch conduit 174 is connected to compressor discharge pressure conduit 128 and through it compressor discharge pressure is admitted to chamber 176 in casing 178 of the servo valve. Movable sleeve 180 surrounds pilot valve 162 and port 182 in the sleeve provides communication between chamber 176 and chamber 184 defined between lands 166 and 168 on the pilot valve.

Movement of the pilot valve to the left under the influence of the power lever, cam 154 or the governor uncovers port 186 in the sleeve to admit compressor discharge pressure through passage 188 to chamber 190 at the left of piston 172. At the same time chamber 192 at the right of the piston is connected through passage 194, port 196 in sleeve 180, and the groove between lands 168 and 170 with vent conduit 198. The pressure in chamber 190 moves piston 172 to the right which movement, through suitable linkage including rod 210 connected to piston 172 and rod 212 connected to eyelids 36, closes the eyelids and decreases the area of exhaust nozzle 26. Movement of pilot valve 162 to the right admits compressor discharge pressure from chamber 184 through port 196 and passage 194 to chamber 192 and vents chamber 190 through passage 188, port 186 and the groove between lands 164 and 166 to vent conduit 214. The pressure in chamber 192 will move piston 172 to left to increase the area of exhaust nozzle 26.

Movable sleeve 180 is part of a "follow up" mechanism commonly provided for servo motors such as servo motor 160. The right end of the sleeve is connected by link 216, pivoted about its middle at pivot 218, to rod 210 on piston 172. Because of this connection between the sleeve and the piston, the sleeve always moves when the piston is moved, but in an opposite direction. Thus, when pilot valve 162 is moved to the right, piston 172 moves to the left and, at the same time, sleeve 180 moves to the right. Movement of both the piston and the sleeve terminates when ports 186 and 196 in the sleeve are aligned with lands 166 and 168 on the pilot valve. At this time the servo system is in equilibrium.

A maximum fuel flow limit for the afterburner should be provided since a point is reached in afterburner combustion above which an increased fuel/air ratio reduces afterburner temperature, thereby decreasing afterburner thrust and increasing the speed of the low pressure spool. In the embodiment shown adjustable bolt 220 acting against the top edge of sleeve 78 limits the maximum effective area of metering ports 74 and 80. A minimum fuel flow limit also should be provided since combustion cannot be supported in the afterburner when the fuel/air ratio is reduced beyond the limit which supports combustion. Adjustable bolt 222 acting against shoulder 224 on stem 110 of sleeve 78 provides a minimum fuel flow limit.

As stated above, afterburner fuel metering ports 74 and 80 are rectangular in shape. Therefore, for a given axial position of sleeve 78 the ratio of the effective metering area to the rotation of the sleeve 78 as caused by compressor discharge pressure responsive bellows 122 is constant. Since a constant pressure drop is maintained across the metering ports, and since rotation of sleeve 78 is proportional to compressor discharge pressure, the ratio of afterburner fuel flow to compressor discharge pressure also is constant for a given axial position of sleeve 78. In the engine operating range where afterburning normally is accomplished, air flow is essentially proportional to compressor discharge pressure. Therefore, it may be said that each axial position of sleeve 78 represents a constant afterburner fuel/air ratio with downward movement of sleeve 78 decreasing the fuel/air ratio and upward movement of the sleeve increasing the fuel/air ratio.

Operation

When any airplane using power plant 10 is ready for take off, power lever 98 is moved to its maximum counterclockwise position and afterburner 24 is set in operation. This position of the power lever establishes an afterburner fuel flow through metering ports 74 and 80 and adjusts the datum for droop governor 132 to establish low pressure spool speed through adjustment of exhaust nozzle area. As the airplane forward speed increases the temperature of the air at inlet 12 increases and the characteristics of the power plant are such that the speed of the low pressure spool tends to decrease with the increase in temperature. By virtue of inlet temperature responsive bellows 155 and its connection through droop governor 132 with exhaust nozzle servo motor 160, an increase in inlet temperature will result in an increase in exhaust nozzle area to increase selected speed. The variation in selected speed is determined by the contouring of cam 154.

The temperature increase in inlet 12 is sensed by bulb 158 and causes bellows 155 to expand. Expansion of the bellows moves cam 154 downward which, through roller 153, rotates link 149 in a clockwise direction about pivot 226 to move abutment 150 and pilot valve 162 to the right and admit compressor discharge pressure from chamber 184 to chamber 192 at the right of piston 172. At the same time chamber 190 at the left of the piston is vented. The pressure in chamber 192 moves the piston to the left to open eyelids 36 and increase the area of exhaust nozzle 26. As the piston moves to the left, sleeve 180 is moved to the right and finally ports 186 and 196 in the sleeve are cut off by lands 166 and 168, respectively, on the pilot valve. When this occurs movement of the piston is stopped and there is no further increase of exhaust nozzle area.

The increase in exhaust nozzle area reduces the pressure in afterburner 24, increasing the pressure drop across low pressure turbine rotor 22, which pressure drop will increase the speed of the low pressure spool. Thus, by means of the control the drop in low pressure spool speed which is the normal result of operation at increased compressor inlet temperature is prevented and maximum thrust is realized.

The control permits optimum operation at partial afterburning while holding the speed of the high pressure spool at its rated value by reducing fuel flow directly and holding low pressure spool speed constant by reducing exhaust nozzle area.

If, during afterburner operation of the power plant, decreased afterburning thrust is desired, power lever 98 is moved in a clockwise direction to a new position, moving link 112 to the left. Movement of the link to the left rotates bell crank 114 in a clockwise direction to move sleeve 78 downward. This movement decreases the effective area of metering ports 74 and 80 to decrease the quantity of fuel flowing through delivery conduit 64 to the afterburner. The fuel flow will be that scheduled by the new position of the power lever.

As afterburner fuel flow decreases, the fuel/air ratio in the afterburner decreases. This results in the static pressure in afterburner 24 decreasing which in turn increases the pressure drop across low pressure turbine rotor 22. The increase in pressure drop tends to increase the speed of the low pressure spool, which speed should remain constant for optimum performance of the power plant. Any increase in the speed of the low pressure spool increases the force of flyweights 134 against shoulder 140.

The increased flyweight force moves shoulder 140 and pilot valve 162 in servo motor 160 to the left, admitting compressor discharge pressure from chamber 184 to chamber 190 at the left of piston 172. At the same time chamber 192 at the right of the piston is vented. The pressure in chamber 190 moves the piston to the right to decrease exhaust nozzle area. As piston 172 moves to the right, sleeve 180 is moved to the left to restore equilibrium in the system. Movement of the piston then is stopped and there is no further decrease of exhaust nozzle area. This decrease in exhaust nozzle area increases afterburner pressure and temperature, the increase in pressure decreasing the pressure drop across turbine rotor 22 and returning the speed of the low pressure spool to its original value.

At the same time that clockwise movement of power lever 98 was decreasing afterburner fuel flow, pivotable link 149 connected to link 112 decreased the load on speeder spring 151 to give a new droop characteristic to the governor. When the speed of the low pressure spool has returned to its original value, the force of flyweights 134 will balance the load of spring 151 at a new position of piston 172 in servo motor 160. This new position affords decreased exhaust nozzle area at a decreased afterburner fuel flow to give less afterburner thrust, while at the same time the speed of the low pressure spool has been maintained substantially constant.

If increased afterburner thrust is desired during partial afterburning operation, power lever 98 is moved in a counterclockwise direction. This movement adjusts sleeve 78 in fuel control 60 to increase fuel flow to the afterburner and also increases the load on speeder spring 151. The resultant static pressure increase in the afterburner decreases the pressure drop across turbine rotor 22 and tends to decrease the speed of the low pressure spool. Exhaust nozzle area, however, is increased by governor 132, increasing the pressure drop across turbine rotor 22 and maintaining the speed of the low pressure spool at its original value. When pilot valve 162 is in a new position of equilibrium between flyweights 134 and spring 151, afterburner thrust will have been increased through increased afterburner fuel flow and exhaust nozzle area, but the speed of the low pressure spool will have been maintained substantially constant.

It is to be understood that the invention is not limited to the specific embodiment herein illustrated and described, but may be used in other ways without departure from its spirit as defined by the following claims.

I claim:

1. A multispool gas turbine power plant having an ungoverned spool including a compressor rotor and a turbine rotor, an afterburner, fuel supply means for said afterburner, an exhaust nozzle for said afterburner, and means for varying the area of said nozzle, in combination with a power lever, metering means in said fuel supply means controlling fuel flow to said afterburner, means for sensing the speed of said spool, said speed sensing means being operatively connected to said nozzle area varying means for varying the area of said nozzle as a function of the speed of said spool, and an operative connection between said lever, said metering means and said speed sensing means for simultaneously scheduling fuel flow to said afterburner and establishing the speed of said spool in accordance with the position of said lever.

2. A gas turbine power plant having a multistage axial flow compressor divided into two or more separate rotors, each of said compressor rotors including one or more compressor stages, a multistage turbine divided into two or more separate rotors, each of said turbine rotors including one or more turbine stages, each of said compressor rotors being connected to a turbine rotor to form a spool, the speed of at least one spool being governed and the speed of another spool being ungoverned, an afterburner, fuel supply means for said afterburner, an exhaust nozzle for said afterburner, and means for varying the area of said nozzle, in combination with a power lever, metering means in said fuel supply means controlling fuel flow to said afterburner, means operatively connected to and controlled by said lever for adjusting said fuel metering means, means for sensing the speed of said ungoverned spool, said speed sensing means being operatively connected to said nozzle area varying means for varying the area of said nozzle as a function of the speed of said ungoverned spool, and an operative connection between said lever and said speed sensing means for establishing the speed of said ungoverned spool.

3. A gas turbine power plant having a multistage axial flow compressor divided into two or more separate rotors, each of said compressor rotors including one or more compressor stages, a multistage turbine divided into two or more separate rotors, each of said turbine rotors including one or more turbine stages, each of said compressor rotors being connected to a turbine rotor to form a spool, the speed of at least one spool being governed and the speed of another spool being ungoverned, an afterburner, fuel supply means for said afterburner, an exhaust nozzle for said afterburner, and means for varying the area of said nozzle, in combination with a power lever, metering means in said fuel supply means controlling fuel flow to said afterburner, means operatively connected to and controlled by said lever for adjusting said fuel metering means, means for further adjusting said fuel metering means as a function of a compressor pressure, means for sensing the speed of said ungoverned spool, said speed sensing means being operatively connected to said nozzle area varying means for varying the area of said nozzle as a function of the speed of said ungoverned spool, and an operative connection between said lever and said speed sensing means for establishing the speed of said ungoverned spool.

4. A gas turbine power plant having a multistage axial flow compressor divided into two or more separate rotors, each of said compressor rotors including one or more compressor stages, a multistage turbine divided into two or more separate rotors, each of said turbine rotors including one or more turbine stages, each of said compressor rotors being connected to a turbine rotor to form a spool, the speed of at least one spool being governed and the speed of another spool being ungoverned, an afterburner, fuel supply means for said afterburner, an exhaust nozzle for said afterburner, and means for varying the area of said nozzle, in combination with a power lever, metering means in said fuel supply means controlling fuel flow to said afterburner, means operatively connected to and controlled by said lever for adjusting said fuel metering means, means for further adjusting said fuel metering means as a function of a compressor pressure, means for regulating the pressure drop across said metering means, means for sensing the speed of said ungoverned spool, said speed sensing means being operatively connected to said nozzle area varying means for varying the area of said nozzle as a function of the speed of said ungoverned spool, and an operative connection between said lever and said speed sensing means for establishing the speed of said ungoverned spool.

5. A multispool gas turbine power plant having an ungoverned spool including a compressor rotor and a turbine rotor, an afterburner, fuel supply means for said afterburner, metering means in said fuel supply means controlling fuel flow to said afterburner, an exhaust nozzle for said afterburner, and means for varying the area of said nozzle, in combination with a manually operated power lever, means operatively connected to and controlled by said lever for adjusting said fuel metering means, speed sensing means driven by said ungoverned spool and operatively connected to said nozzle area varying means for varying the area of said nozzle as a function of the speed of said spool, temperature responsive means operatively connected to said nozzle area varying means for varying the area of said nozzle as a function of the temperature of air at one station within said power plant, means for establishing the datum of said speed sensing means, and means operatively connected to said lever for adjusting said datum establishing means.

6. A multispool gas turbine power plant having an ungoverned spool including a compressor rotor and a turbine rotor, an afterburner, fuel supply means for said afterburner, metering means in said fuel supply means controlling fuel flow to said afterburner, an exhaust nozzle for said afterburner, and means for varying the area of said nozzle, in combination with a manually operated power lever, means operatively connected to and controlled by said lever for adjusting said fuel metering means, speed sensing means driven by said ungoverned spool and operatively connected to said nozzle area varying means for varying the area of said nozzle as a function of the speed of said spool, temperature responsive means operatively connected to said nozzle area varying means for varying the area of said nozzle as a function of the temperature of air at one station within said power plant, means for varying the area of said metering means as a function of a power plant pressure, means for regulating the pressure drop across said metering means, means for establishing the datum of said speed sensing means, and means operatively connected to said lever for adjusting said datum establishing means.

7. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, an exhaust nozzle for said afterburner, and means for varying the area of said nozzle, in combination with a manually operated power lever, means operatively connected to and controlled by said lever for adjusting said fuel metering means, a droop governor driven by said low pressure spool and operatively connected to said nozzle area varying means for varying the area of said nozzle as a function of low pressure spool speed, temperature responsive means operatively connected to said nozzle area varying means for varying the area of said nozzle as a function of the temperature of air entering said power plant, means for varying the area of said metering means as a function of a compressor pressure, means for regulating the pressure drop across said metering means, means for establishing the datum of said governor, and means operatively connected to said lever for adjusting said datum establishing means.

8. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, an exhaus nozzle for said afterburner, and means for varying the area of said nozzle, in combination with a manually operated power lever, means operatively connected to and controlled by said lever for adjusting said fuel metering means, a droop governor driven by said low pressure spool and operatively connected to said nozzle area varying means for varying the area of said nozzle as a function of low pressure spool speed, temperature responsive means operatively connected to said nozzle area varying means for varying the area of said nozzle as a function of the temperature of air entering said power plant, means for varying the area of said metering means as a function of a compressor pressure, means for regulating the pressure drop across said metering means, means for establishing the datum of said governor, means operatively connected to said lever for adjusting said datum establishing means, and means for limiting the area of said metering means.

9. A twin spool gas turbine power plant having a high pressure spool including a compressor rotor and a turbine rotor, a low pressure spool including a compressor rotor and a turbine rotor, an afterburner, fuel supply means for said afterburner, metering means in said fuel supply means controlling fuel flow to said afterburner, said metering means including cooperating ports capable of relative axial and rotational movement with respect to each other, an exhaust nozzle for said afterburner, and means for varying the area of said nozzle, in combination with a manually operated power lever, said power lever being operatively connected with one of said metering ports for imparting one of said movements thereto for varying fuel flow, pressure responsive means operatively connected with the other of said metering ports for imparting the other of said movements thereto for varying fuel flow as a function of an engine operating pressure, a droop governor driven by said low pressure spool and operatively connected to said nozzle area varying means for varying the area of said nozzle to regulate low pressure spool speed, temperature responsive means operatively connected to said nozzle area varying means for varying the area of said nozzle as a function of the temperature of air entering said power plant, means for establishing the datum of said governor, and means operatively connected to said lever for adjusting said datum establishing means.

References Cited in the file of this patent

UNITED STATES PATENTS

| | | |
|---|---|---|
| 2,736,166 | Mock | Feb. 28, 1956 |
| 2,753,685 | Mattinson | July 10, 1956 |

FOREIGN PATENTS

| | | |
|---|---|---|
| 161,680 | Australia | Apr. 16, 1953 |